United States Patent [19]

Smith et al.

[11] Patent Number: 4,875,436
[45] Date of Patent: Oct. 24, 1989

[54] WASTE HEAT RECOVERY SYSTEM

[75] Inventors: Edward M. Smith, Wyncote, Pa.; Richard C. Cornelison, Hiram, Ohio

[73] Assignee: W. R. Grace & Co.-Conn., New York, N.Y.

[21] Appl. No.: 197,530

[22] Filed: May 23, 1988

Related U.S. Application Data

[63] Continuation-in-part of Ser. No. 154,144, Feb. 9, 1988, abandoned.

[51] Int. Cl.$^4$ .............................................. F22D 1/00
[52] U.S. Cl. .................................. 122/7 R; 60/39.182; 122/468; 122/470; 422/180
[58] Field of Search ............... 122/7 R, 468, 470; 60/39.182; 29/157 R; 422/180

[56] References Cited

U.S. PATENT DOCUMENTS

| | | | |
|---|---|---|---|
| 2,020,686 | 11/1935 | Kaiser | 122/468 X |
| 3,380,810 | 4/1968 | Hamblin | 23/288 |
| 3,992,876 | 11/1976 | Aguet | 60/39.12 |
| 4,106,286 | 8/1978 | Inui et al. | 60/39.18 |
| 4,160,805 | 7/1979 | Inaba et al. | 422/180 |
| 4,164,546 | 8/1979 | Welty | 423/239 |
| 4,466,241 | 8/1984 | Inui et al. | 60/39.182 |
| 4,572,110 | 2/1986 | Haeflich | 122/7 R |
| 4,693,213 | 9/1987 | Yanai et al. | 122/7 R |
| 4,706,612 | 11/1987 | Moreno et al. | 60/39.182 X |
| 4,711,009 | 8/1987 | Cornelison | 29/157 |

Primary Examiner—Edward G. Favors
Attorney, Agent, or Firm—Steven T. Trinker

[57] ABSTRACT

There is provided a waste heat recovery system characterized by a boiler assembly including a heat recovery steam generator through which exhaust gas is flowed. The boiler assembly includes a high temperature steam tube heat exchanger, or superheater, and at a location downstream therefrom a water tube boiler. An ammonia gas injector is utilized for injecting ammonia into the exhaust gas stream which injector is located upstream of the superheater and water tube boiler. Finally, there is provided a low temperature selective catalytic reduction unit located downstream of the low temperature water tube boiler or evaporator. This arrangement simplifies retrofitting of existing heat recovery systems.

16 Claims, 1 Drawing Sheet

WASTE HEAT RECOVERY SYSTEM

RELATED APPLICATION

This application is a continuation-in-part of copending application Ser. No. 154,144 filed Feb. 9, 1988 abandoned.

This invention relates, as indicated, to an improved waste heat recovery system and more particularly to the relative location of the boiler elements and a $NO_x$ removal system, otherwise known as an SCR or selective catalytic reduction unit.

BACKGROUND OF THE INVENTION AND PRIOR ART

Selective catalytic reduction (SCR) is the best available technology for emission control of the oxides of nitrogen ($NO_x$). $NO_x$ is generally recognized as the most significant precursor gas that leads, in combination with volatile organic compounds, to the formation of ozone in the troposphere. $NO_x$ is also believed to be responsible for the nitric acid component of acid raid, particularly in the Western United States. Considerable legislation on a regional and national basis limits $NO_x$ emissions. A need therefore exists for SCR systems that can be mass produced on an economical basis and provide high conversion efficiency over extended periods of time.

Although the devices of the present invention may be used in conjunction with any hydrocarbon fueled system which on burning yields an exhaust gas stream which contains significant amounts of $NO_x$, the primary system with which these devices are used is a gas turbine driven generator system for generating electrical power.

Catalytic converters now being used for $NO_x$ control in Japan, West Germany and the United States are comprised of vanadia and the oxides of tungsten or molybdenum on a washcoat of titania. These are known as "vanadia SCR systems". The catalytic material is displayed on molded or extruded ceramic honeycomb, formed metal plates or a stainless-steel-foil honeycomb structure. Vanadia SCR systems typically operate at optimum conversion efficiency of 700° F. (370° C.), or less efficiently in an outer range from 570° F. to 750° F. (300° C.–400° C.).

An SCR system is needed that can operate in a temperature zone lower than the 700° F. (370° C.). This need arises because the vanadia SCR has to be located in the mid-section in most boiler trains, which is the only practical location in the boiler train where the proper temperature zone exists. However, this often results in the boiler manufacturer having to design the boiler with provisions for splitting the boiler to allow for insertion of the vanadia SCR, often adding expense beyond that associated with the vanadia SCR and its associated ammonia injection system.

Furthermore, an even greater need is arising because many major boiler trains now in the field will have to be retrofitted with SCR units when pending de$NO_x$ legislation is passed, such as California Rule 1134. Otherwise, retrofit installation of vanadia SCR systems will require the cutting apart of boiler trains, relocation of the displaced section on new foundations and associated repiping—generally considered a major project with costs at a multiple of the vanadia SCR system itself.

The present invention satisfies these needs through location of an SCR system downstream of the heat recovery steam generator (HRSG), at a location where the boiler does not have to be redesigned in two sections, or cut apart in the case of retrofit with an SCR system.

The system of the present invention includes a low temperature SCR catalyst that reaches maximum conversion efficiency for $NO_x$ at approximately 400° F. (200° C.), is located downstream of the HRSG and has its ammonia injection system at a location as far upstream (toward the gas turbine or other combustion device or source of $NO_x$) as possible, in the interest of causing the maximum diffusion of $NH_3$ in the exhaust stream, such that when the exhaust stream flows through the low temperature SCR system the gas will be a homogeneous mixture to assure maximum $NO_x$ conversion and the minimum possible amount of $NH_3$ for complete $NO_x$ conversion, since $NH_3$ is an irritant with an unpleasant odor, even at very low concentrations.

The low temperature SCR (LT-SCR) is located downstream of the HRSG. The LT-SCR can be located upstream or downstream of a fuel economizer or other heat exchanger such as a regenerator for preheating combustion air, but such that the temperature of the LT-SCR is in the range of 300° F. to 550° F. (150° C. to 290° C.).

The ammonia injection grid should ideally be located as near as possible to the turbine outlet, which in combined cycle and simple cycle gas turbine systems is generally close to 1000° F. (540° C.). In this way the maximum $NH_3$ mixing will take place with the exhaust gas in the zone of the most turbulent flow before impinging on the LT-SCR. However, if a carbon monoxide converter system is present, the ammonia injection must take place downstream of the CO converter, but as far upstream of the LT-SCR as possible, to assure maximum mixing.

Reference may be had to the patents to Inui et al, 4,106,286 dated Aug. 15, 1978 and 4,466,241 dated Aug. 21, 1984 for disclosure of closely related devices which are adapted to have SCR's which operate at higher temperatures because of the location of the SCR between portions of the evaporator, (4,466,241) or between the evaporator and the fuel economizer (4,106,286). The location is such that the SCR is in a temperature zone where the temperature is between 570° F.–750° F. (300° C.–400° C.). It so happens that a vanadium SCR system is the catalyst of choice, and its temperature of most suitable operation is about 700° F. for the reduction of $NO_x$. Hence the location of the SCR is determined to be in that zone where the temperature is most favorable to the operation of the catalyst. The disclosures of U.S. Pat. Nos. 4,106,286 and 4,466,241 are incorporated herein by reference. With exception of the location of the SCR unit, the elements of the waste heat recovery system of the present invention are essentially the same as those utilized in the prior art and their structure is well known.

BRIEF STATEMENT OF THE INVENTION

Briefly stated, the present invention is in a system for the recovery of heat from an exhaust gas stream, such as the exhaust gas stream from a gas turbine for generating electricity. In general, the system comprises a conduit for conveying an exhaust gas stream from a gas turbine-generator unit through a boiler assembly in which steam or high temperature water is generated. The steam generator portion of the boiler is characterized by one or more high temperature steam-tube heat exchanger or, more specifically, a superheater, and at a downstream location relative thereto, a water-tube boiler. Located upstream of the steam-tube heat exchanger, or alternatively, near the gas turbine exhaust is an ammonia injector of conventional design. Finally, there is provided downstream of the water-tube boiler, a low temperature selective catalytic reduction unit in which $NO_x$ pollutants are substantially removed by reaction with the ammonia to form nitrogen and water. Platinum is the catalyst of choice for such a device because it reaches its maximum activity at 400° F. instead of 700° F. for the commonly used vanadium based catalyst. In the preferred embodiments of this invention, the catalytic SCR is formed of corrugated thin section stainless steel having a wash coat of alumina, zirconia or titania in which has been deposited an effective amount of platinum group metals. The catalyst may be platinum or platinum/palladium/rhodium. However, the catalyst of choice is platinum. Other catalytically active bodies, e.g., ceramic honeycomb or pellet form may also be used.

Reference may be had to U.S. Pat. No. 4,711,009 dated Dec. 8, 1987 disclosing a corrugated thin metal catalyst support and the method of making it, useful in accordance herewith. The disclosure of this patent is incorporated herein by reference.

BRIEF DESCRIPTION OF THE DRAWINGS

The invention may be better understood by having reference to the annexed drawings wherein.

DETAILED DESCRIPTION OF THE INVENTION

Figures 1, 2:
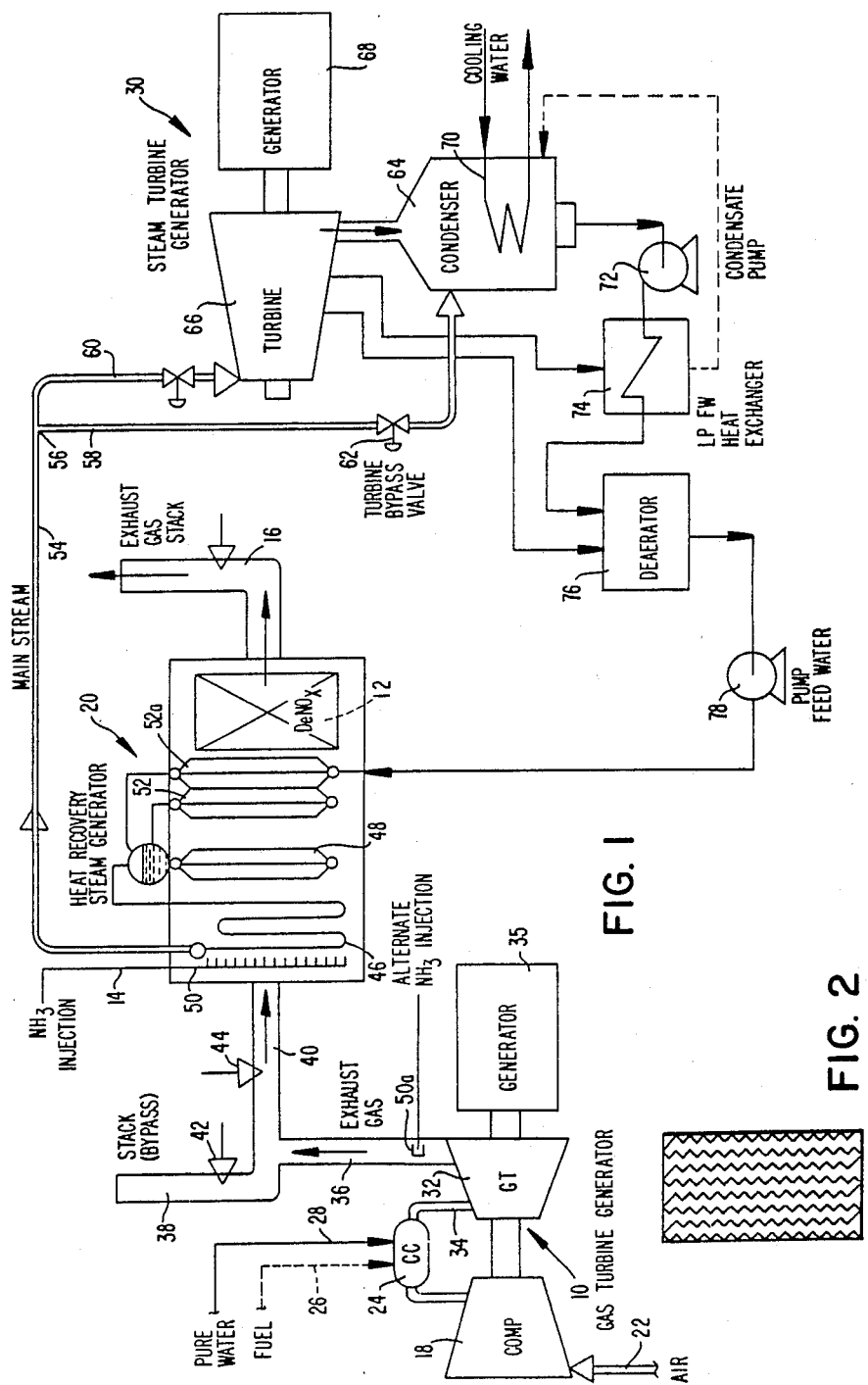
FIG. 1 is a diagrammatic and schematic illustration of a waste heat recovery system in accordance herewith.
FIG. 2 is a diagrammatic illustration of a catalyst unit formed of a corrugated stainless steel catalyst support for a platinum group metal catalyst and useful in the heat recovery system hereof for converting $NO_x$ to nitrogen and water with the aid of ammonia.

As indicated above, the present invention is in a waste heat recovery system characterized in that the SCR unit operates at a lower temperature and is located downstream of the low temperature evaporator or fuel economizer rather than between the superheater and the fuel economizer as taught in the prior art and practiced in established plants. This arrangement makes retrofitting much less difficult and costly than in the case of those systems which depend on vanadia SCR systems, the vanadium oxide type of catalyst, where the boiler assembly must be divided and spaced to allow insertion of the SCR unit at a point where the temperature accommodates most efficiently the catalyst utilized. The platinum catalyst, which is the catalyst of choice in the present devices, operates to catalyze the reduction of nitrogen oxides with ammonia most efficiently at about 400° F., instead of at about 700° F. and hence can be located in a region of the apparatus where the temperature of the exhaust gas stream best accommodates the LT-SCR catalyst, and the cost of retrofitting existing equipment is vastly less. However, alternately, a catalyst comprised of platinum, rhodium or palladium or a combination thereof can comprise the low temperature catalyst. The catalyst is displayed in a ceramic oxide coat of alumina, zirconia or titania or a combination thereof.

Referring now to FIG. 1, there is here illustrated in diagrammatic and schematic form, a waste heat recovery system in accordance with the present invention. There are thus provided a gas turbine driven generator generally indicated at 10, a heat recovery steam generator generally indicated at 20 and a steam turbine driven generator generally indicated at 30. The waste heat recovery boiler apparatus or steam generator 20, generates steam by utilizing heat from the exhaust gases from the gas turbine 10. This steam is supplied to a steam turbine generator 30 to convert the steam power into electric power. Hence the heat of the exhaust is recovered in a useful form rather than being exhausted directly to the atmosphere along with whatever pollutants are contained therein. To remove a major pollutant, there is provided a selective catalytic reduction unit 12 which coacts with the ammonia injected through the injector 14 to convert the nitrogen oxides ($NO_x$) to nitrogen and water prior to introduction into the exhaust stack 16.

The gas turbine generator 10 comprises a compressor 18 for pressurizing air admitted through the line 22, a combustor 24 for burning a mixture of pressurized air and fuel with water, the fuel being supplied through the line 26 and the water through line 28. The combustion products are conducted into the gas turbine 32 through the line 34 to drive the gas turbine and in turn rotate the shaft of the generator 35. The hot exhaust gas exits the turbine through the exhaust line 36 which splits into a by-pass stack 38 and a main line 40. Valves 42 and 44 control which of the lines the exhaust gas passes.

The hot exhaust gas then enters the heat exchanger 46 and then enters a primary evaporator 48. Immediately prior to the superheater 46 there is provided a grid 50 through which ammonia, $NH_3$, is introduced into the exhaust gas stream. It will be observed that in this embodiment, shown in FIG. 1, the primary evaporator is closely adjacent to the secondary evaporator 52 and 52A.

Alternatively, the ammonia injection 50A, can preferably be achieved immediately downstream of the gas turbine, where turbulence is relatively high and the mixing path relatively long, thereby assuring better diffusion of the ammonia in the exhaust gas stream. The temperature of the exhaust gas at this point is between about 1000° F. and 1100° F. However, in any case, the ammonia injection must be downstream of any carbon monoxide catalytic converter that is installed in the turbine exhaust.

The cooler exhaust gas now enters the LT-SCR or $deNO_x$ unit 12 where it passes in contact with a catalyst, preferably a platinum catalyst, where at a temperature between 300° F. and 550° F. it is catalytically reduced to nitrogen and water, at a percentage conversion of 70% to 95%. Alternately, the catalyst can be platinum, rhodium or palladium or any combination thereof.

At this point the cooled exhaust gas, with most of its heat abstracted, is admitted to the exhaust stack 16 substantially free of nitrogen oxides, $NO_x$. If desired, a fuel economizer unit or water preheater unit (not shown) may be inserted in the system to abstract still more heat from the exhaust gas stream.

The steam produced in the heat recovery steam generator unit 20 is then sent to the steam turbine unit 30 through the line 54. The line 54 splits at 56 into a by-pass line 58 and a steam turbine line 60. The by-pass line 58 is controlled by a by-pass valve 62 which controls the flow of steam to the condenser 64. The steam may, therefore, pass through the line 60 into the steam turbine 66 where it drives the generator 68 for the generation of electricity. The exhaust from the steam turbine 66 is conducted to the condenser 64, where it is condensed by means of a source of cooling water admitted through the line 70.

The condensate from the condenser 64 is picked up by the pump 72 and passed through a low pressure feed water heater 74 from whence it goes to a deaerator 76 and then through a feed water pump 78 into the evaporator 52A.

FIG. 2 shows in diagrammatic form a corrugated accordion folded metal catalyst support 80. A combination of platinum, rhodium, or palladium comprises the catalyst. This catalyst support may be a nonnesting laminar or opposed pattern corrugated thin metal foil which is accordion folded or wound thin stainless steel, or layered corrugated strips of thin metal in nonnesting relation and including a catalyst. This support may be manufactured by the process described in U.S. Pat. No. 4,711,009 dated Dec. 8, 1987. Any other catalyst support system may be used, for example ceramic honeycomb, pellet, or the like. Where a ceramic pellet impregnated with a catalyst is employed, the arrangement may be as shown in U.S. Pat. No. 4,106,286, FIG. 4.

There has thus been provided an improved waste heat recovery system which is characterized by relocation of the SCR or selective catalytic recovery unit from a position in the high temperature zone of the prior art to a low temperature zone outside or downstream of the secondary evaporator enabling the use of the lower temperatures of conversion of the $NO_x$ to harmless by-products, and much simpler retro-fitting of units currently in place to utilize catalytic means for removing up to 95% of the $NO_x$ present in the exhaust gases from various engines and turbines.

What is claimed is:

1. A waste heat recovery system comprising in combination:
   (a) a conduit for conveying an exhaust gas stream;
   (b) a boiler assembly connected to said conduit including a heat recovery steam generator through which said exhaust gas is flowed, and characterized by a high temperature steam tube heat exchanger and, at a downstream location relative thereto, a water-tube boiler;
   (c) an ammonia gas injector for injecting ammonia gas into the exhaust gas stream and located upstream of the water-tube boiler in juxtaposition to the exhaust gas source; and
   (d) a low temperature selective catalytic reduction unit located downstream of the water-tube boiler.

2. A waste heat recovery system in accordance with claim 1 wherein the selective catalytic reduction unit includes a platinum catalyst.

3. A waste heat recovery system in accordance with claim 1 wherein the selective catalytic reduction unit includes platinum and a combination of rhodium and palladium as a catalyst.

4. A waste heat recovery system in accordance with claim 1 wherein the selective catalytic reduction unit includes a corrugated thin metal catalyst support.

5. A waste heat recovery system in accordance with claim 1 wherein the selective catalytic reduction unit includes a corrugated accordion folded thin metal catalyst support.

6. A waste heat recovery system in accordance with claim 4 wherein corrugated thin metal catalyst support is provided with a coating of alumina in which is disposed a platinum catalyst.

7. A waste heat recovery system in accordance with claim 2 wherein corrugated thin metal catalyst support is provided with a coating of zirconia, on which is disposed a platinum catalyst.

8. A waste heat recovery system in accordance with claim 4 wherein corrugated thin metal catalyst support is provided with a coating of titania, on which is disposed a platinum catalyst.

9. A waste heat recovery system in accordance with claim 4 wherein corrugated thin metal catalyst support is provided with a coating of alumina, on which is disposed a catalyst comprised of platinum and a combination of rhodium and palladium.

10. A waste heat recovery system in accordance with claim 4 wherein corrugated thin metal catalyst support is provided with a coating of zirconia, on which is disposed a catalyst comprised of platinum and a combination of rhodium and palladium.

11. A waste heat recovery system in accordance with claim 4 wherein corrugated thin metal catalyst support is provided with a coating of titania, on which is disposed a catalyst comprised of platinum and a combination of rhodium and palladium.

12. A waste heat recovery system in accordance with claim 1 further comprising a steam turbine into which steam generated by said high temperature steam-tube exchanger is adapted to be introduced.

13. A waste heat recovery system in accordance with claim 1 further characterized by an exhaust gas stack including valve means for controlling the flow rate of the gas through the system.

14. A waste heat recovery system in accordance with claim 13 further including by-pass means upstream of the heat recovery steam generator including valve means for regulating the flow of exhaust gas through the system.

15. A waste heat recovery system comprising in combination:
   (a) a conduit for conveying an exhaust gas stream from a gas turbine generator;
   (b) a boiler assembly connected to said conduit including a heat recovery steam generator through which the exhaust gas is flowed and characterized by a superheated steam generator, a primary evaporator and a secondary evaporator in that order;
   (c) an ammonia gas injector for injecting ammonia gas into the exhaust gas stream and located ahead of or upstream from the superheated steam generator and the primary evaporator; and
   (d) a low temperature selective catalytic reduction unit located downstream of the secondary evaporator for removing substantially all of the $NO_x$ from the exhaust gas stream by catalyzed reaction of the ammonia with the $NO_x$ in said exhaust gas stream.

16. A waste heat recovery system in accordance with claim 1 which is further characterized by an exhaust gas stack including valve means for controlling the flow rate of exhaust gas through the system.

* * * * *